(12) United States Patent
Song et al.

(10) Patent No.: US 12,436,596 B2
(45) Date of Patent: Oct. 7, 2025

(54) POWER DISTRIBUTION BOARD

(71) Applicants: SQ TECHNOLOGY (SHANGHAI) CORPORATION, Shanghai (CN); INVENTEC CORPORATION, Taipei (TW)

(72) Inventors: Wenwen Song, Shanghai (CN); Hong-Chou Lin, Taipei (TW); Yu-Fan Chen, Taipei (TW)

(73) Assignees: SQ TECHNOLOGY (SHANGHAI) CORPORATION, Shanghai (CN); INVENTEC CORPORATION, Taipei (TW)

( * ) Notice: Subject to any disclaimer, the term of this patent is extended or adjusted under 35 U.S.C. 154(b) by 71 days.

(21) Appl. No.: 18/407,652

(22) Filed: Jan. 9, 2024

(65) Prior Publication Data
US 2025/0155957 A1    May 15, 2025

(30) Foreign Application Priority Data
Nov. 13, 2023    (CN) .......................... 202311509590.6

(51) Int. Cl.
*G06F 1/00*    (2006.01)
*G06F 1/3296*    (2019.01)

(52) U.S. Cl.
CPC .................. *G06F 1/3296* (2013.01)

(58) Field of Classification Search
CPC .................................................... G06F 1/3296
See application file for complete search history.

(56) References Cited

U.S. PATENT DOCUMENTS

| | | | |
|---|---|---|---|
| 10,199,940 B1* | 2/2019 | Bui ....................... | H02J 1/082 |
| 10,862,398 B2* | 12/2020 | Phadke ................ | H02M 3/335 |
| 10,908,194 B1* | 2/2021 | Chiang .............. | G01R 19/16547 |
| 11,824,447 B2* | 11/2023 | Cheng ................. | H02M 1/0009 |
| 2015/0235543 A1* | 8/2015 | Dietz ..................... | H04L 49/40 |
| | | | 340/286.02 |
| 2017/0237271 A1* | 8/2017 | Kelly-Morgan ...... | H02J 7/0045 |
| | | | 320/166 |
| 2017/0237274 A1* | 8/2017 | Lazarev .................. | H02J 3/28 |
| | | | 320/166 |
| 2022/0350388 A1* | 11/2022 | Lin ........................ | G06F 1/266 |
| 2024/0097483 A1* | 3/2024 | Ning ..................... | H02J 7/342 |
| 2024/0111862 A1* | 4/2024 | Emerson ............... | G06F 21/554 |

* cited by examiner

*Primary Examiner* — Mohammed H Rehman
(74) *Attorney, Agent, or Firm* — Maschoff Brennan (57) ABSTRACT

A power distribution board includes a complex programmable logic device (CPLD), a first buck chip and a second buck chip. The first buck chip is connected to the complex programmable logic device. The first buck chip is configured to receive a first direct current (DC) voltage, lower the first DC voltage to a first voltage, and supply the first voltage to the complex programmable logic device. The second buck chip is configured to receive a second direct current voltage, lower the second direct current voltage to a second voltage, and supply the second voltage to a power module. The first direct current voltage and the second direct current voltage has a same voltage value.

8 Claims, 7 Drawing Sheets

FIG. 7

POWER DISTRIBUTION BOARD

This non-provisional application claims priority under 35 U.S.C. § 119(a) on Patent Application No(s). 202311509590.6 filed in China on Nov. 13, 2023, the entire contents of which are hereby incorporated by reference.

BACKGROUND

1. Technical Field

This disclosure relates to a power distribution board.

2. Related Art

Nowadays, the electricity is commonly supplied to an immersive server using a 220-Volt alternating current by a power supply unit (PSU). However, this power supply method results in high power consumption.

SUMMARY

Accordingly, this disclosure provides a power distribution board to solve the above-mentioned problems.

According to an embodiment of this disclosure, a power distribution board includes a complex programmable logic device (CPLD), a first buck chip and a second buck chip. The first buck chip is connected to the complex programmable device, and configured to receive a first direct current voltage, lower the first direct current voltage to a first voltage, and supply the first voltage to the programmable device. The second buck chip is configured to receive a second direct current voltage, lower the second direct current voltage to a second voltage, and supply the second voltage to the power module. The first direct current voltage is equal to the second direct current voltage.

In view of the above description, compared to supplying electricity to a server through a power supply unit with 220 volts of alternating current, the power distribution board according to one or more embodiments of this disclosure may effectively lower power consumption during the process of power transmission and conversion.

BRIEF DESCRIPTION OF THE DRAWINGS

The present disclosure will become more fully understood from the detailed description given herein below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
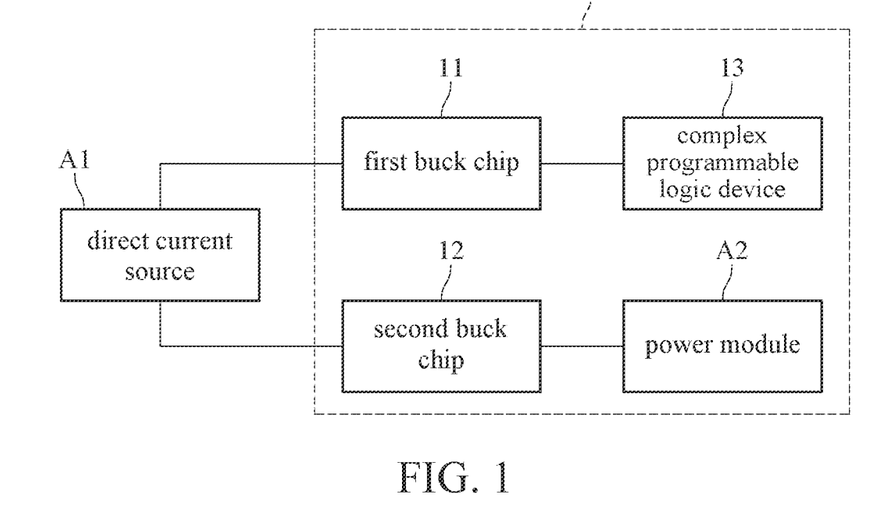
FIG. 1 is a block diagram of a power distribution board according to the first embodiment.

Please refer to FIG. 1, which is a block diagram of a power distribution board according to the first embodiment. As shown in FIG. 1, the power distribution board 1 includes a first buck chip 11, a second buck chip 12 and a complex programmable logic device 13. The first buck chip 11 is connected to the complex programmable logic device 13 and a direct current (DC) source A1. The second buck chip 12 is connected to a DC source A1 and a power module A2.

The first buck chip 11 may be a buck converter. The input voltage of the second buck chip 12 may be 40 to 60 volts, the output voltage of the second buck chip 12 may be 12 volts, and the output power of the second buck chip 12 may be 1600 watts. For example, the second buck chip 12 may serve as the power module with the model number as Q50SN120A4RKDS. The first buck chip 11 is configured to receive the first DC voltage from the DC source A1, lower the first DC voltage to the first voltage and supply the first voltage to the complex programmable logic device 13. The second buck chip 12 is configured to receive the second DC voltage from the DC source A1, lower the second DC voltage to the second voltage and supply the second voltage to the power module A2. The power module A2 may be a power connector for supplying electricity to a server. The first DC voltage equals the second DC voltage. For example, the voltage values of the first DC voltage and the second DC voltage may each range from 48 to 54 volts. Furthermore, the voltage values of the first DC voltage and the second DC voltage may each be 48 volts. The first voltage may be a stand-by voltage (e.g., 3.3 volts). The second voltage may be 12 volts. Besides, the second buck chip may include several sub-chips, and the sub-chips are connected to their power modules respectively and output the second voltage to their power modules with 3200 watts power, respectively.

In comparison with the power supply unit providing 220 volts AC electricity to the server, the method according to this disclosure may effectively lower the power consumption in electricity transmission and conversion.

Figure 2:
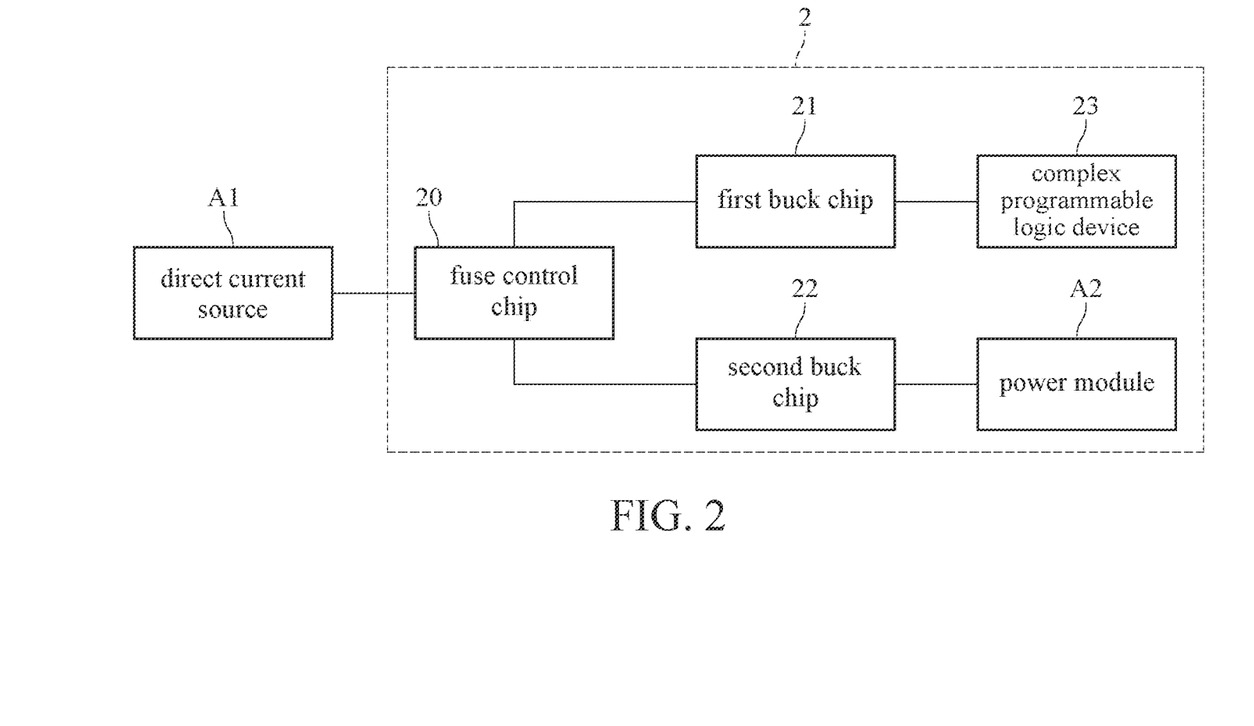
FIG. 2 is a block diagram of a power distribution board according to the second embodiment.

Please refer to FIG. 2, wherein FIG. 2 is a block diagram of a power distribution board according to the second embodiment. As shown in FIG. 2, the power distribution board 2 includes a fuse control chip 20, a first buck chip 21, a second buck chip 22, and a complex programmable logic device 23. The fuse control chip 20 is connected to the DC source A1, the first buck chip 21, and the second buck chip 22. The first buck chip 21 is connected to the complex programmable logic device 23. The second buck chip 22 is connected to the power module A2. The implementation of the first buck chip 21, the second buck chip 22 and the complex programmable logic device 23 in the power distribution board 2 is the same as the implementation of the first buck chip 11, the second buck chip 12, and the complex programmable logic device 13 in FIG. 1, which is not explained here.

The fuse control chip 20 is configured to receive electricity from the DC source A1 and respectively provides the first DC voltage and second DC voltage to the first buck chip 21, and second buck chip 22 based on the electricity. The fuse control chip 20 may be a hot swap voltage controller. Besides, a clip screw hold may be disposed between the fuse control chip 20 and the DC source A1.

For example, the fuse control chip 20 outputs most of the electricity as the second DC voltage to the second buck chip 22 after receiving the electricity from the DC source A1 to supply the electricity to the main board; and, the fuse control chip 20 outputs the remaining electricity as the first DC voltage to the first buck chip 21. For example, the first voltage may be the stand-by voltage (e.g., 3.3 volts).

Figure 3:
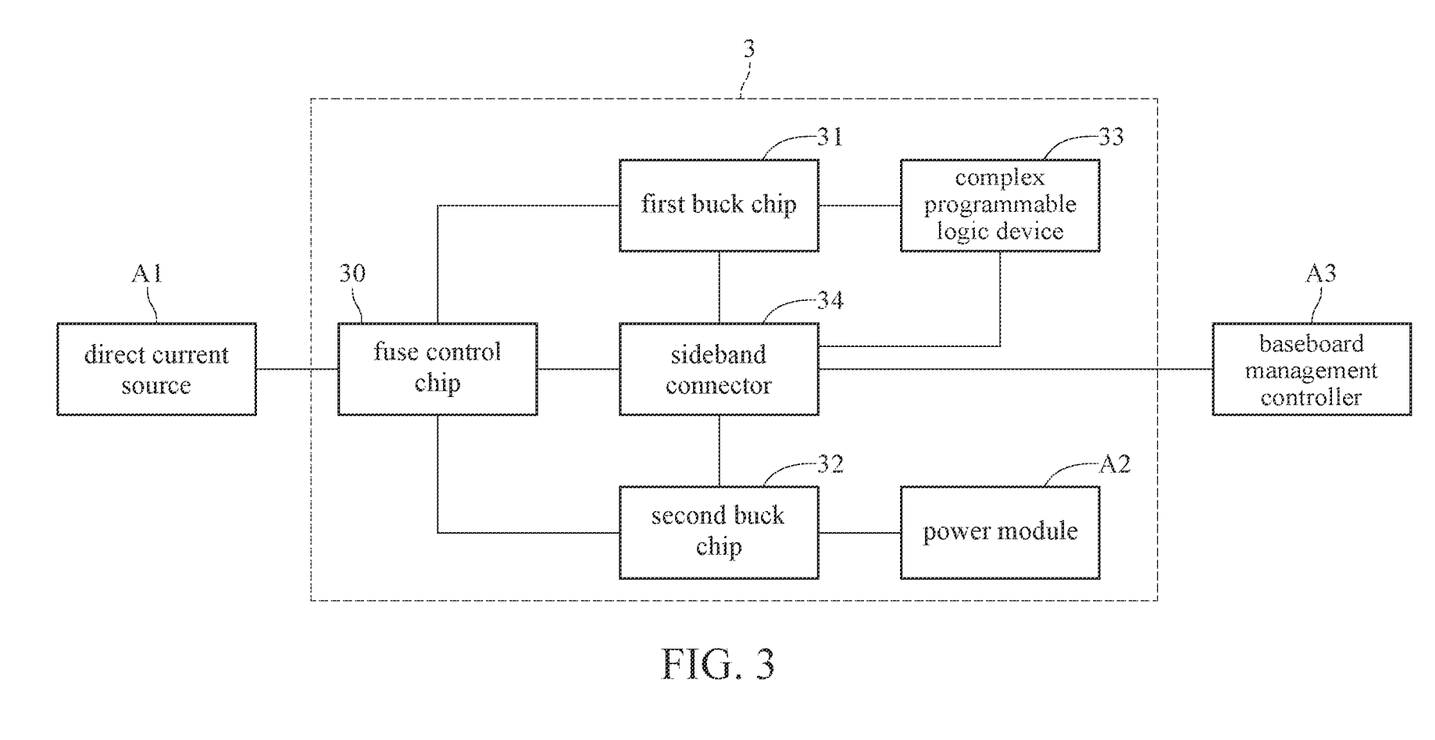
FIG. 3 is a block diagram of a power distribution board according to the third embodiment.

Please refer to FIG. 3, wherein FIG. 3 is a block diagram of a power distribution board according to the third embodiment. As shown in FIG. 3, the power distribution board 3 includes a fuse control chip 30, a first buck chip 31, a second buck chip 32, a complex programmable logic device 33 and a sideband connector 34. The fuse control chip 30 is connected to the DC source A1, the first buck chip 31, the second buck chip 32 and the sideband connector 34. The first buck chip 31 is connected to the complex programmable logic device 33. The second buck chip 32 is connected to the power module A2. The implementation of first buck chip 31, second buck chip 32 and the complex programmable logic device 33 in the power distribution board 3 is the same as the implementation of the fuse control chip 20, the first buck chip 21, the second buck chip 22 and the complex programmable logic device 23 in FIG. 2, which is not explained here.

The sideband connector 34 is connected to the complex programmable logic device 33, and the sideband connector 34 connects the baseboard management controller A3 of the main board to the fuse control chip 30, the first buck chip 31, the second buck chip 32, and the complex programmable logic device 33. The sideband connector 34 may be connected to the complex programmable logic device 33 through an inter-integrated circuit interface, and connect the baseboard management controller A3 to the fuse control chip 30, the first buck chip 31 and the second buck chip 32. Accordingly, the operating status of the power distribution board 3 may be output by the sideband connector 34 to the baseboard management controller A3 on the main board. The operating status includes the power consumption, voltage and current data of the fuse control chip 30, the first buck chip 31, the second buck chip 32 and the complex programmable logic device 33. By the connection of the sideband connector 34 with the complex programmable logic device 33, the register of the complex programmable logic device 33 may be updated by the baseboard management controller A3.

Besides, the first buck chip 31 and the second buck chip 32 may be further configured to output at least one of a power good signal, an alert signal, a fine-DC-power (DCOK) signal and a fine-AC-power (ACOK) signal to the complex programmable logic device 33 through the sideband connector 34 to the complex programmable logic device 33 for monitoring.

Figure 4:
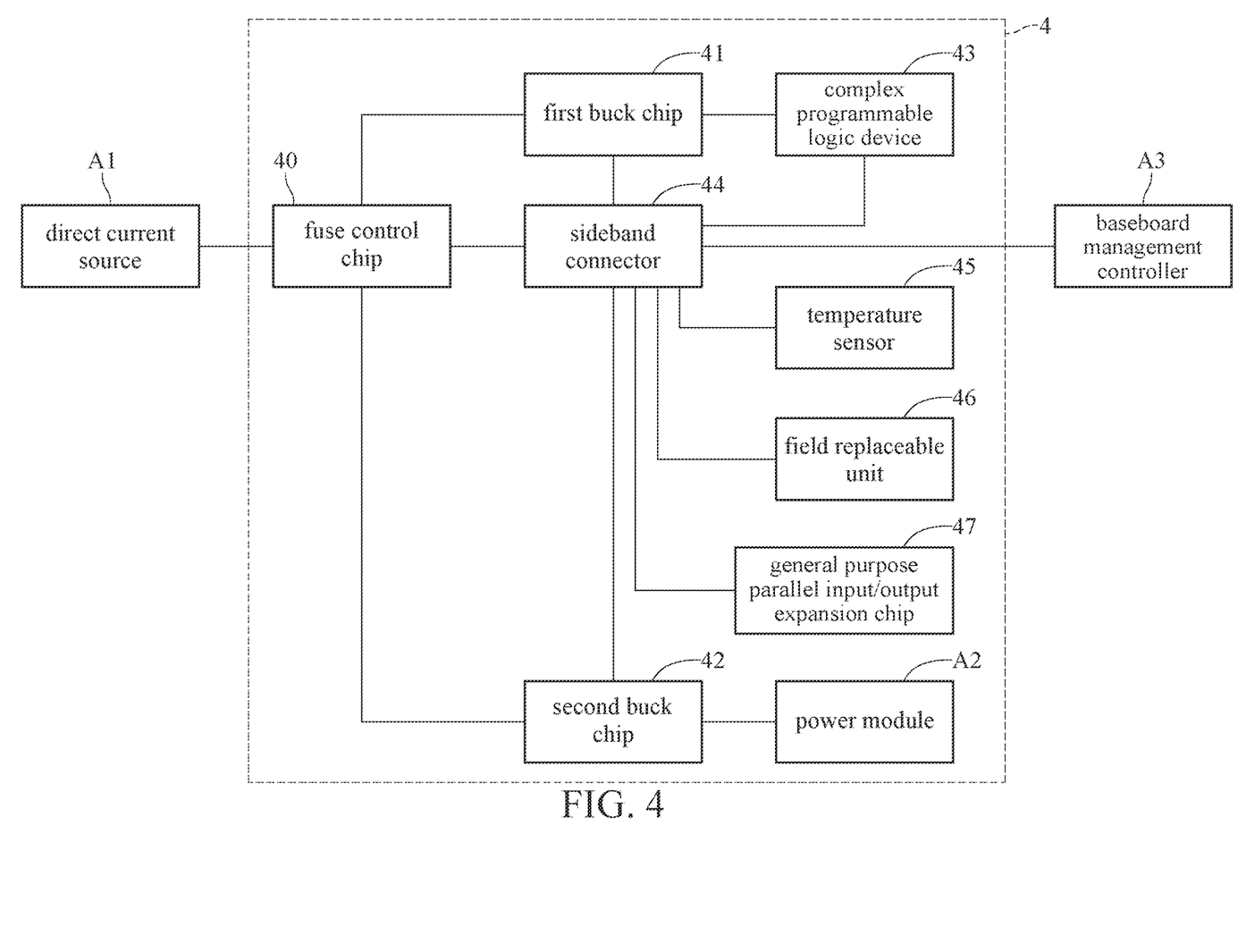
FIG. 4 is a block diagram of a power distribution board according to the fourth embodiment.

Please refer to FIG. 4, wherein FIG. 4 is a block diagram of a power distribution board according to the fourth embodiment. As shown in FIG. 4, the power distribution board 4 includes a fuse control chip 40, a first buck chip 41, a second buck chip 42, a complex programmable logic device 43, a sideband connector 44, a temperature sensor 45, a field replaceable unit (FRU) 46, and a general purpose parallel input/output expansion chip 47. The fuse control chip 40 is connected to the DC voltage A1, the first buck chip 41, the second buck chip 42, and the sideband connector 44. The first buck chip 41 is connected to the complex programmable logic device 43. The second buck chip 42 is connected to the power module A2. The implementation of the fuse control chip 40, the first buck chip 41, the second buck chip 42, the complex programmable logic device 43 in the power distribution board 4 is the same as the implementation of the fuse control chip 30, the first buck chip 31, the second buck chip 32, and the complex programmable logic device 33 in FIG. 3, which is not explained here.

The sideband connector 44 further connects the baseboard management controller A3 to the temperature sensor 45, the field replaceable unit 46 and the general purpose parallel input/output expansion chip 47 through an inter-integrated circuit interface. The temperature sensor 45, the field replaceable unit 46 and the general purpose parallel input/output expansion chip 47 are optionally disposed components. The sideband connector 44 may be connected to the baseboard management controller A3 to at least one of the temperature sensor 45, the field replaceable unit 46, and the general purpose parallel input/output expansion chip 47.

The temperature sensor 45 may be configured to sense the temperature of at least one or more of elements on the power distribution board 4. The general purpose parallel input/output expansion chip 47 may write the data into the field replaceable unit 46 or read the data from the field replaceable unit 46 via the sideband connector 44.

The first buck chip 41 may be further directly connected the temperature sensor 45, the field replaceable unit 46 and the general purpose parallel input/output expansion chip 47 to provide the first voltage to the temperature sensor 45, the field replaceable unit 46 and the general purpose parallel input/output expansion chip 47.

Besides, the general purpose parallel input/output expansion chip 47 may be connected to the hitless lead of the complex programmable logic device 43 through the sideband connector 44. Therefore, when the baseboard management controller A3, for example, updates the firmware of the complex programmable logic device 43 through a local area network (LAN), it may prevent the complex programmable logic device 43 from experiencing the blackout.

Figure 5:
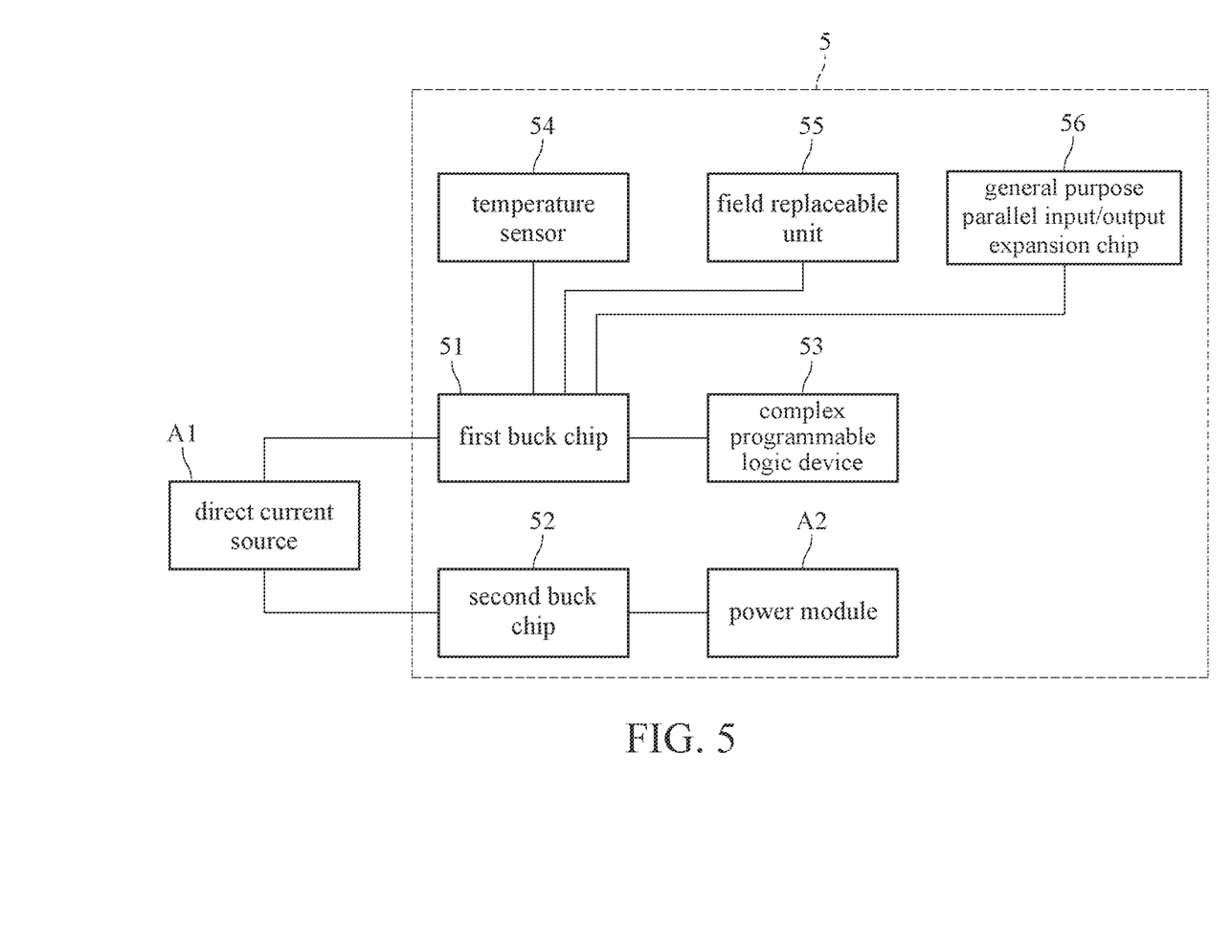
FIG. 5 is a block diagram of a power distribution board according to the fifth embodiment.

Please refer to FIG. 5, wherein FIG. 5 is a block diagram of a power distribution board according to the fifth embodiment. As shown in FIG. 5, the power distribution board 5 includes a first buck chip 51, a second buck chip 52, a complex programmable logic device 53, a temperature sensor 54, a field replaceable unit 55, and a general purpose parallel input/output expansion chip 56. The first buck chip 51 is connected to the DC source A1, the complex programmable logic device 53, the temperature sensor 54, the field replaceable unit 55, and the general purpose parallel input/output expansion chip 56. The second buck chip 52 is connected to the DC source A1 and the power module A2. The implementation of the first buck chip 51, the second buck chip 52, the complex programmable logic device 53 in the power distribution board 5 is the same as the implementation of the first buck chip 11, the second buck chip 12, and the complex programmable logic device 13 in FIG. 1, which is not explained here.

The temperature sensor 54, the field replaceable unit 55 and the general purpose parallel input/output expansion chip 56 may be the same as the temperature sensor 45, the field replaceable unit 46 and the general purpose parallel input/output expansion chip 47, respectively, as depicted in FIG. 4.

The temperature sensor 54, the field replaceable unit 55 and the general purpose parallel input/output expansion chip 56 are optionally disposed components. The first buck chip 51 may be connected to at least one of the temperature sensor 54, the field replaceable unit 55, and the general purpose parallel input/output expansion chip 56. After the first buck chip 51 lowers the first DC voltage to the first voltage, the first buck chip 51 may further supply the first voltage to at least one or more of the temperature sensor 54, the field replaceable unit 55, and the general purpose parallel input/output expansion chip 56. For example, the first voltage received by each of the temperature sensor 54, the field replaceable unit 55 and the general purpose parallel input/output expansion chip 56 may be the stand-by voltage, such as 3.3 volts.

Figure 6:
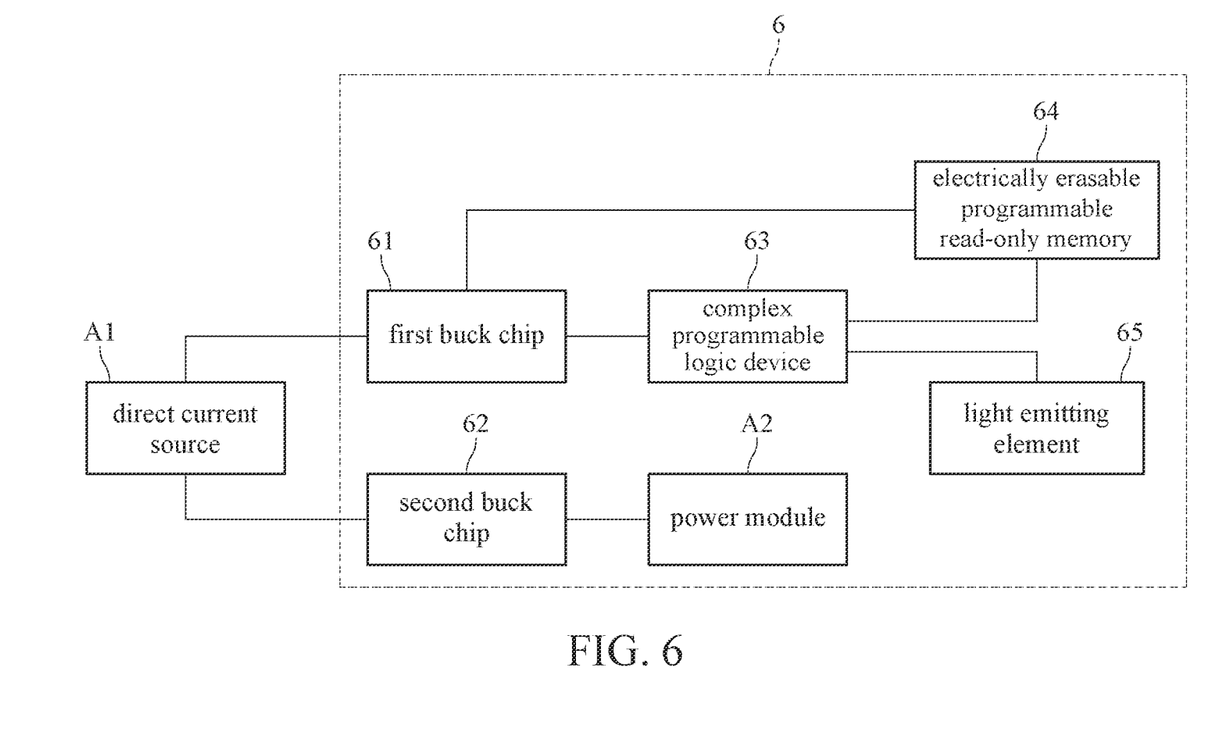
FIG. 6 is a block diagram of a power distribution board according to the sixth embodiment.

Please refer to FIG. 6, wherein FIG. 6 is a block diagram of a power distribution board according to the sixth embodiment. As shown in FIG. 6, the power distribution board 6 includes a first buck chip 61, a second buck chip 62, a complex programmable logic device 63, an electrically erasable programmable read-only memory (EEPROM) 64, and a light emitting element 65. The first buck chip 61 is connected to the DC source A1, the complex programmable logic device 63, and the electrically erasable programmable read-only memory 64. The second buck chip 62 is connected to the DC source A1 and the power module A2. The complex programmable logic device 63 is connected to the electrically erasable programmable read-only memory 64 and the light emitting element 65. The light emitting element 65 is an element capable of emitting light in different colors, such as a light emitting diode (LED). The implementation of the first buck chip 61, the second buck chip 62, the complex programmable logic device 63 in the power distribution board 6 is the same as the implementation of the first buck chip 11, the second buck chip 12, and the complex programmable logic device 13 in FIG. 1, which is not explained here.

Specifically, the first buck chip 61 may provide the first voltage to the electrically erasable programmable read-only memory 64, wherein the first voltage may be the stand-by voltage, such as 3.3 volts. The electrically erasable programmable read-only memory 64 may be connected to the complex programmable logic device 63 through an inter-integrated circuit interface. The electrically erasable programmable read-only memory 64 may be configured to store firmware backup of the complex programmable logic device 63. Therefore, when the complex programmable logic device 63 is updated (e.g., updated by the aforementioned baseboard management controller), if the update process encounters an unexpected anomaly resulting in a pause or failure, it is possible to ensure the normal operation of the complex programmable logic device 63 by reading the firmware backup of the complex programmable logic device 63. Moreover, the complex programmable logic device 63 may control the light emitting element 65 to emit the light indicating the corresponding status of the complex programmable logic device 63. For example, the green light may correspond to normal operating status. Therefore, when the complex programmable logic device 63 is operating normally based on the aforementioned firmware backup, the complex programmable logic device 63 may control the light emitting element 65 to emit green light.

Figure 7:
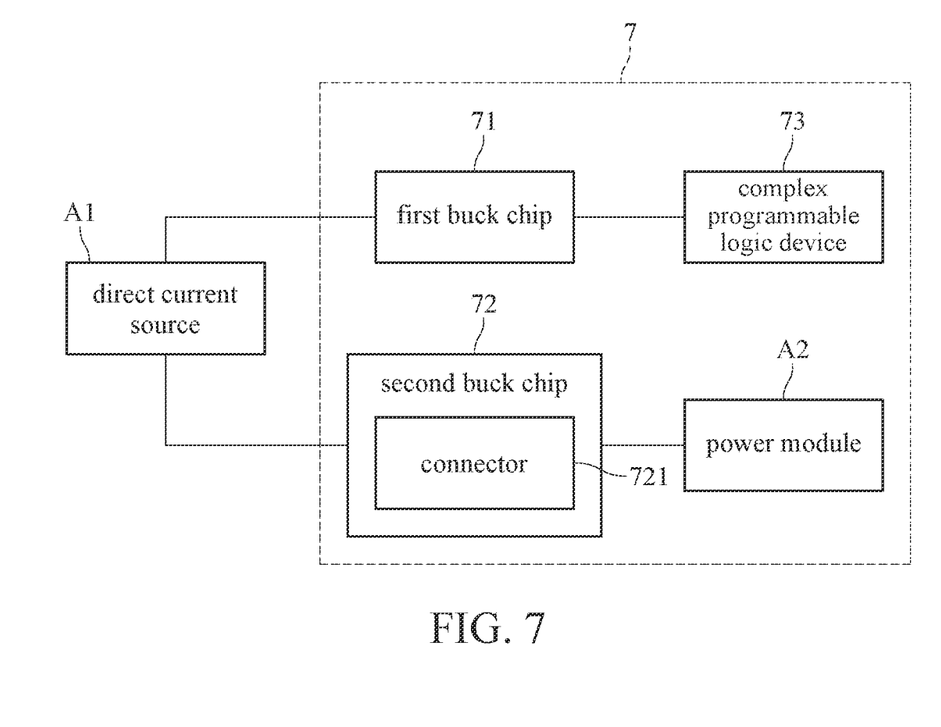
FIG. 7 is a block diagram of a power distribution board according to the seventh embodiment.

Please refer to FIG. 7, wherein FIG. 7 is a block diagram of a power distribution board according to the seventh embodiment. As shown in FIG. 7, the power distribution board 7 includes a first buck chip 71, a second buck chip 72 and a complex programmable logic device 73. The first buck chip 71 is connected to the DC source A1 and the complex programmable logic device 73. The second buck chip 72 is connected to the DC source A1 and the power module A2.

The implementation of the first buck chip 71 and the complex programmable logic device 73 in the power distribution board 7 is the same as the implementation in the first buck chip 11 and the complex programmable logic device 13 in FIG. 1, which is not explained here.

The second buck chip may include the connector 721. The connector 721 is configured to receive at least one of a firmware update command and a firmware debug command related to the second buck chip 72. The firmware update command and the firmware debug command may be commands given by the user. The firmware update command may be configured to update the firmware of the second buck chip 72, and the debug command may be configured to debug the firmware of the second buck chip 72.

It should be noted that the power distribution board in this disclosure may be implemented not only through the aforementioned various embodiments but also through the combination of some or all of the embodiments mentioned above. Additionally, the power distribution board in this disclosure may be applied to an immersive server.

In view of the above description, compared to supplying power to a server through a power supply unit with 220 volts of alternating current, the power distribution board of one or more embodiments of this disclosure may effectively lower power consumption during the process of power transmission and conversion. Furthermore, by connecting the baseboard management controller to the fuse control chip through an inter-integrated circuit interface, the operating status of the power distribution board may be output to the baseboard management controller on the main board. This may allow the baseboard management controller to monitor the operating status of the power distribution board. By connecting the general purpose parallel input/output expansion chip to the hitless lead of the complex programmable logic device, it may prevent the complex programmable logic device from losing power when being updated. Storing the firmware backup of the complex programmable logic device in the electrically erasable programmable read-only memory may ensure the normal operation of the complex programmable logic device even in the event of anomalies during the update process.

What is claimed is:

1. A power distribution board, comprising:
    a complex programmable logic device;
    a first buck chip connected to the complex programmable device, and configured to receive a first direct current voltage, lower the first direct current voltage to a first voltage, and supply the first voltage to the programmable device;
    a second buck chip configured to receive a second direct current voltage, lower the second direct current voltage to a second voltage, and supply the second voltage to a power module;
    a fuse control chip connected to a direct current power, the first buck chip and the second buck chip, and configured to receive electricity from the direct current power and provide a first portion of the electricity as a first direct current voltage to the first buck chip, and a second portion of the electricity as a second direct current voltage to the second buck chip respectively; and
    a sideband connector configured to connect a baseboard management controller with the fuse control chip, the first buck chip, and the second buck chip,
    wherein the first direct current voltage is equal to the second direct current voltage.

2. The power distribution board according to claim 1, wherein the sideband connector is connected to the baseboard management controller with the fuse control chip, the first buck chip, and the second buck chip through an inter-integrated circuit interface.

3. The power distribution board according to claim 1, wherein the sideband connector is connected to at least one of a temperature sensor, a field replaceable unit and a general purpose parallel input/output expansion chip through an inter-integrated circuit interface.

4. The power distribution board according to claim 1, further comprising:
an electrically erasable programmable read-only memory connected to the complex programmable logic device through an inter-integrated circuit interface, and configured to store firmware back-up of the complex programmable logic device.

5. The power distribution board according to claim 1, wherein the first buck chip is further configured to supply the first voltage to at least one of a temperature sensor, a field replaceable unit and a general parallel input/output expansion chip, wherein the first voltage equals a stand-by voltage.

6. The power distribution board according to claim 1, wherein the second buck chip is further connected to the complex programmable logic device, and the first buck chip and the second buck chip are further configured to output at least one of a power good signal, a warning signal, a fine-DC-power signal and a fine-AC-power signal to the complex programmable logic device.

7. The power distribution board according to claim 1, wherein the second buck chip comprises a connector configured to receive at least one of a firmware update command or a firmware debug command related to the second buck chip.

8. The power distribution board according to claim 1, wherein the complex programmable logic device is further connected to a light emitting element configured to emit light corresponding to a state of the complex programmable logic device.

\* \* \* \* \*